US012781938B2

(12) United States Patent
Torstensson

(10) Patent No.: US 12,781,938 B2
(45) Date of Patent: Nov. 3, 2026

(54) VEHICLE HEADLAMP FOR HIGH MOUNT APPLICATIONS

(71) Applicant: Tyri International, Inc., Stevens Point, WI (US)

(72) Inventor: Per-Arne Torstensson, Gothenburg (SE)

(73) Assignee: Tyri International Inc., Stevens Point, WI (US)

( * ) Notice: Subject to any disclaimer, the term of this patent is extended or adjusted under 35 U.S.C. 154(b) by 0 days.

(21) Appl. No.: 19/036,697

(22) Filed: Jan. 24, 2025

(65) Prior Publication Data

US 2025/0264201 A1 Aug. 21, 2025

Related U.S. Application Data

(60) Provisional application No. 63/553,814, filed on Feb. 15, 2024.

(51) Int. Cl.
*F21S 41/25* (2018.01)
*F21S 41/151* (2018.01)
(Continued)

(52) U.S. Cl.
CPC ............. *F21S 41/63* (2018.01); *F21S 41/151* (2018.01); *F21S 41/24* (2018.01); *F21S 41/25* (2018.01);
(Continued)

(58) Field of Classification Search
CPC .......... F21S 41/24; F21S 41/151; F21S 41/25; F21S 41/29; B60Q 1/0058; F21Y 2103/10; F21Y 2115/10
See application file for complete search history.

(56) References Cited

U.S. PATENT DOCUMENTS 4,733,335 A * 3/1988 Serizawa ................ F21V 29/83
362/547
7,163,327 B2 1/2007 Henson et al.
(Continued)

FOREIGN PATENT DOCUMENTS

CN 1753192 A * 3/2006
CN 206 592 963 U 10/2017
(Continued)

OTHER PUBLICATIONS

Search English translation of DE 102011085315 A1 (Year: 2013).*
(Continued)

*Primary Examiner* — Omar Rojas Cadima
(74) *Attorney, Agent, or Firm* — Wong Meyer Smith & McConnell

(57) ABSTRACT

A lighting system for a vehicle includes an LED light source and first, second and third waveguides, each being configured to receive the light emitted from the light source at a first end and output an intermediate light pattern at an opposing second end. A projection lens is disposed adjected the second end of the waveguides to receive the light pattern and project it in front of the vehicle. At least one of the waveguides may include a refracting surface array configured to shape the light received from the LED light source. The lighting system may be mounted to the vehicle at an elevated location above an implement associated with the vehicle to illuminate areas in front of the implement.

18 Claims, 10 Drawing Sheets

(51) Int. Cl.

| | |
|---|---|
| ***F21S 41/24*** | (2018.01) |
| ***F21S 41/29*** | (2018.01) |
| ***F21S 41/63*** | (2018.01) |
| *F21W 107/10* | (2018.01) |
| *F21Y 103/10* | (2016.01) |
| *F21Y 115/10* | (2016.01) |

(52) U.S. Cl.
CPC .......... *F21S 41/29* (2018.01); *F21W 2107/10* (2018.01); *F21Y 2103/10* (2016.08); *F21Y 2115/10* (2016.08)

(56) References Cited

U.S. PATENT DOCUMENTS

| | | | |
|---|---|---|---|
| 7,611,272 | B2 | 11/2009 | Specht et al. |
| 9,306,670 | B2 | 4/2016 | Fujiwara et al. |
| 9,381,852 | B2 | 7/2016 | Foltin |
| 10,247,380 | B2 | 4/2019 | Hager et al. |
| 10,632,901 | B2 | 4/2020 | Danner et al. |
| 11,220,207 | B2 | 1/2022 | Kulkarni et al. |
| 2023/0015642 | A1 | 1/2023 | Horn et al. |

FOREIGN PATENT DOCUMENTS

| | | | | | |
|---|---|---|---|---|---|
| CN | 107 975 693 | A | | 5/2018 | |
| DE | 102011085315 | A1 | * | 5/2013 | ............ F21S 41/153 |
| DE | 10 2013 212352 | A1 | | 12/2014 | |
| DE | 10 2017 129254 | A1 | | 7/2018 | |
| DE | 102017112971 | A1 | * | 12/2018 | ............ F21S 41/265 |
| EP | 2012056 | A1 | * | 1/2009 | .............. F21V 5/045 |
| EP | 3329179 | B1 | | 5/2019 | |
| EP | 2518397 | B1 | * | 5/2020 | ............ F21S 41/143 |
| EP | 3080513 | B1 | | 10/2020 | |
| EP | 4137744 | A1 | | 2/2023 | |

OTHER PUBLICATIONS

Search English translation of EP 2518397 B1 (Year: 2020).*
English translation of CN 1753192 A (Year: 2006).*
English translation of EP 2012056 A1 (Year: 2009).*
English translation of DE 102017112971 A1 (Year: 2018).*

* cited by examiner

VEHICLE HEADLAMP FOR HIGH MOUNT APPLICATIONS

CROSS REFERENCE TO RELATED APPLICATIONS

This application claims the benefit of U.S. provisional patent application Ser. No. 63/553,814 filed Feb. 15, 2024, the entire contents of which are hereby incorporated by reference.

BACKGROUND AND SUMMARY

This invention relates to vehicle lights, and more particularly to a high-mounted headlamp configured for use with commercial and industrial vehicles that includes a first, second, and third waveguide to form a beam pattern suitable for high beam and low beam vehicle headlights.

A vehicle is typically outfitted with a number of automotive lamps or lights that provide illumination in certain areas in and around the vehicle. Certain lights may be mounted and configured to illuminate areas within the vehicle interior while other lights may be mounted and configured to illuminate areas exterior to the vehicle. Typically, the interior lights may illuminate areas that facilitate operator ingress or egress, or operation and control of the vehicle. The exterior lights may also facilitate operator ingress or egress, and may also be configured to illuminate other external areas. For example, exterior vehicle lights such as headlights and fog lights may provide forward illumination for lighting a path of travel, and rearward or side illumination for safety or for providing an indication of a function, such as reverse indicator lights, directional indicators, taillights, and brake lights. In a work vehicle, exterior lights may also be provided for illuminating a work area, typically located forward of the cab of the work vehicle.

In the context of exterior vehicle lighting configured to provide forward illumination of the vehicle's path of travel while traveling in low light, dark areas or at night, vehicles often include a combination of both low beam and high beam headlights or headlamps. Low beams provide relatively short-range illumination as compared to high beams, and their illumination pattern is angled towards the ground so as to illuminate the roadway without adversely obscuring the field of vision of oncoming drivers. In contrast, high beams provide a long-range focus that are well suited for illuminating an area above and beyond that of the low beams, and are particularly well suited for roadways that lack street lighting or other overhead illumination.

In a conventional vehicle headlamp, in either of the low beam or high beam configuration a light source, such as a halogen bulb, may be located within a parabolic reflector. Light emitted from the bulb is predominantly collimated as it reflects outwardly off the interior surface of the parabolic reflector. A front lens then directs the emitted light onto a portion of the roadway, corresponding to the desired illumination pattern of either the low beam or high beam.

Prior efforts have been made to improve upon such systems and simplify the illumination of roadways including the use of a unitary reflector formed of a plurality of interior mirrored surfaces arranged in a stepwise fashion. However, all such prior embodiments continue to be limited in their ability to collimate and direct only the emitted light that contacts the reflector.

More recent developments in the improvement of vehicle headlamps have seen the introduction of dual-beam headlights, which incorporate both the low beam and the high beam into a single headlamp system. The original dual beam headlamps provide a single light bulb or other light generator, with a greater intensity than that of a traditional headlamp. The system may utilize an elliptical reflector that focuses the light at a focal point adjacent the front end of the reflector. A shaped shield may be selectively positioned at the focal point to alter the shape and brightness of light that passes through the focal point to a projector lens that transmits the emitted light onto the roadway. However, such conventional dual-beam systems continue to rely upon high-energy consumption and low-reliability halogen or xenon light bulbs. Compounded by the need for mechanical solenoid activation for modulation between low beam and high beam operation, such prior systems are susceptible to mechanical failures. Therefore, an improvement over this design has been to use a dual source in the dual beam headlight. One source, typically an LED, is shaped by a unitary reflector formed of a plurality of mirrored surfaces arranged in a stepwise fashion to produce the low beam and a second source can be mounted opposing the first with a second plural mirror surface arranged to produce the high beam. The interface between the two mirrored surfaces produces the necessary asymmetric cut-off shape to control the intensity distribution of the low beam. This system eliminates the use of unreliable and high-energy consuming bulbs or active mechanical components, but the dual reflectors occupy a relatively large volume. A further improvement on this design is a system using waveguides (total internal reflection optics) to form the shape and intensity of the beam, eliminating the need for the reflectors and drastically reducing size.

In the context of commercial and industrial vehicles, many such vehicles include forward mounted tools and accessories such as snowplow blades, bulldozer blades, front end loader buckets, tractor buckets, hydraulic arms or booms, etc. Low mounted headlights, such as those installed on traditional passenger vehicles are mounted approximately 0.6 to 1.0 meters above the roadway. Exclusive use of such traditional low-mounted headlights would result in the obstruction of the emitted lighting path by the forward mounted tools and accessories. To compensate for the blocked light from the low-mounted headlights on vehicles with the accessories described, so-called work lights (as opposed to road lights) can be mounted high on the vehicle, typically over the cab. The work lights, however, do not have true high and low beam functions, with comparatively wide illumination and no effective method to avoid dazzling oncoming traffic or to sufficiently illuminate further along the road when there is no oncoming traffic. Accordingly, there exists a need to develop a high mounted vehicle headlamp product that also realizes the benefits of a simplified solution for shaping and projecting the illumination pattern of both low beam and high beam lights according to national legal standards without the use of unreliable and high-energy consuming bulbs or active mechanical components.

The present invention contemplates an LED receiving waveguide with an integrated lens assembly to form a beam pattern suitable for a combination of high beam and low beam vehicle headlights in a high-mounted headlamp configured for use with commercial and industrial vehicles which are to be road-certified by the traffic authority of the country in which the vehicle is to be operated.

The high-mount headlight assembly for a vehicle according to the present invention may be in the form of a light system for use with a commercial and industrial vehicle. In one aspect, the light system may include at least one light emitting diode (LED) light source mounted to a vehicle that is configured to emit a light upon activation, and plurality of waveguides configured to receive the light emitted from the at least one LED light source at a first end and output a light pattern at an opposing second end. The plurality of waveguides may include at least one waveguide configured to emit an extended high beam light pattern. The plurality of waveguides may comprise a first waveguide configured to emit a low beam light pattern and a second waveguide configured to emit a standard high beam light pattern, in combination with a third waveguide configured to emit the extended high beam light pattern.

The high-mount headlight assembly may have one or more refracting surface arrays disposed within a body of at least one of the waveguides, located between the first and second ends. The refracting surface array may be configured to shape the light received from the LED light source to form the light pattern at the second end of the waveguide, which is presented to a projection lens disposed adjected the second end of the waveguide. The projection lens is configured to receive the light pattern and project the same in front of the vehicle towards a roadway. Generally, the waveguides of the present invention are configured to emit the light into a desired light pattern for use in vehicle headlights.

Specifically, then, one aspect of the present invention may include a first waveguide that is adapted to form a low beam light pattern at a high-mounted headlight of the vehicle, a second waveguide adapted to form at least a portion of a high beam light pattern, i.e., an intermediate beam, at the high-mounted headlight of the vehicle, and a third waveguide adapted to form at least an extended portion of a high beam light pattern at the high-mounted headlight of the vehicle.

Another aspect of the present invention may include a refracting surface array disposed within the corresponding waveguide that includes a void disposed within the body of one or more of the waveguides, a collector lens upstream of the void and a redistribution surface downstream of the void. The collector lens may be configured to asymmetrically distribute light about the refracting redistribution surfaces, and the redistribution surfaces may be configured to collimate the light received thereon.

In another aspect of the present invention the redistribution surface of the array may include a plurality of refracting surfaces of varying configurations and orientations, which redirect the light received thereon into an asymmetrical low beam or high beam light pattern.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

Figure 1:
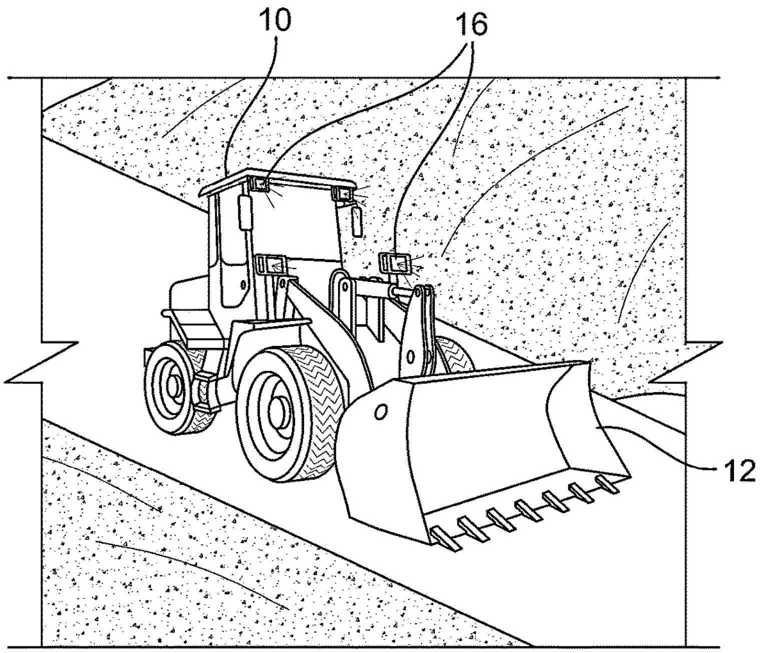
FIG. 1 is an illustration of an industrial vehicle including high-mounted headlights.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Figure 2:
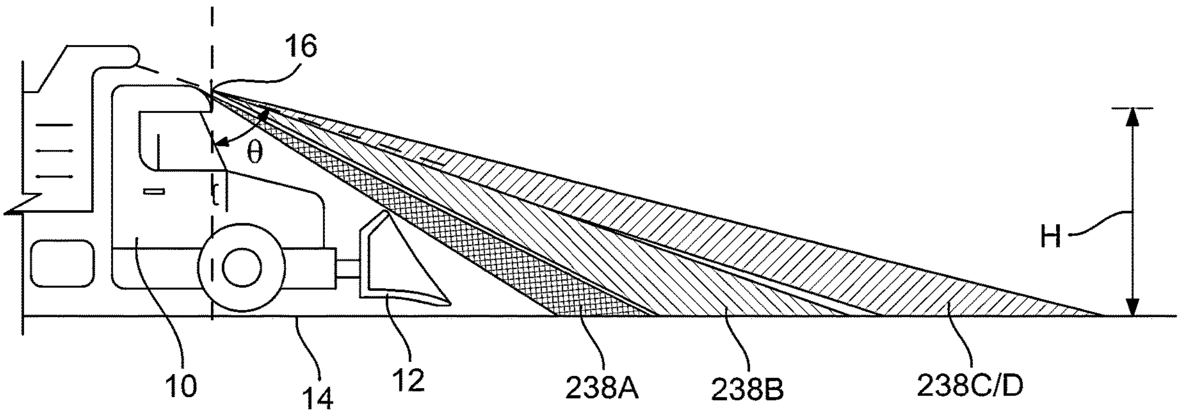
FIG. 2 is a left side illustration of an industrial vehicle including a high mount headlight that includes a first, second, and third waveguide to form a beam pattern including a low beam, high beam and extended high beam according to one embodiment of the present invention.

Referring to the following description in which like reference numerals represent like parts throughout the disclosure, and initially to FIGS. 1 and 2, a vehicle 10, being a commercial or industrial vehicle with a forward mounted accessory 12 such as a front end loader shovel is shown. Placement of the headlights at a height of approximately 0.6 to 1.0 meters above the roadway 14, which is traditional for a passenger vehicle, would result in the forward mounted accessory 12 obscuring or blocking all or some of the light pattern emitted from the headlight. Accordingly, a headlight 16 according to the present invention is configured to be mounted to a vehicle at a height H, of approximately 2.0 to 3.5 meters above the roadway 14 or surface supporting the vehicle 10. Elevation of the headlight 16 to height H allows for the emitted light pattern to be directed onto the roadway 14 in front of the vehicle 10 and the forward mounted accessory 12. However, to avoid the emitted light pattern from adversely impacting oncoming drivers, i.e., "dazzling," it is necessary to downwardly tilt the angle of the low-beam light pattern emitted from headlight 16 so that, in accordance with current regulations, the driving beam light pattern strikes the driving surface of oncoming traffic within 30 meters from the front of the vehicle.

In a conventional system, downward tilting of the high-mounted headlight redirects the emitted light pattern to an area closer to the vehicle, undesirably limiting the range of high beam light pattern emitted. That is to say that reduction of "dazzling" shifts the emitted light pattern which has the undesirable side effects of reducing high beam light on the vehicle's driving lane.

Alternatively, providing a high-mounted headlight 16, according to the present invention includes a plurality of waveguides include a first waveguide configured to emit a low beam light pattern 238A, a second waveguide configured to emit a standard high beam, i.e., an intermediate beam, light pattern 238B, and a third waveguide configured to emit an extended high beam light pattern 238C/238D. By way of providing a third waveguide configured to emit extended high beam light pattern. The high-mounted headlight 16, according to the present invention, may be mounted at a height H, of approximately 2.0 to 3.5 meters above the roadway 14, with a downward tilt angle θ of approximately between 4.0° and 7.0° which provides an extended high beam light pattern 238C/238D on the vehicle's driving lane at a distance of approximately 30 to 175 meters, while simultaneously minimizing "dazzling."

Figure 3:
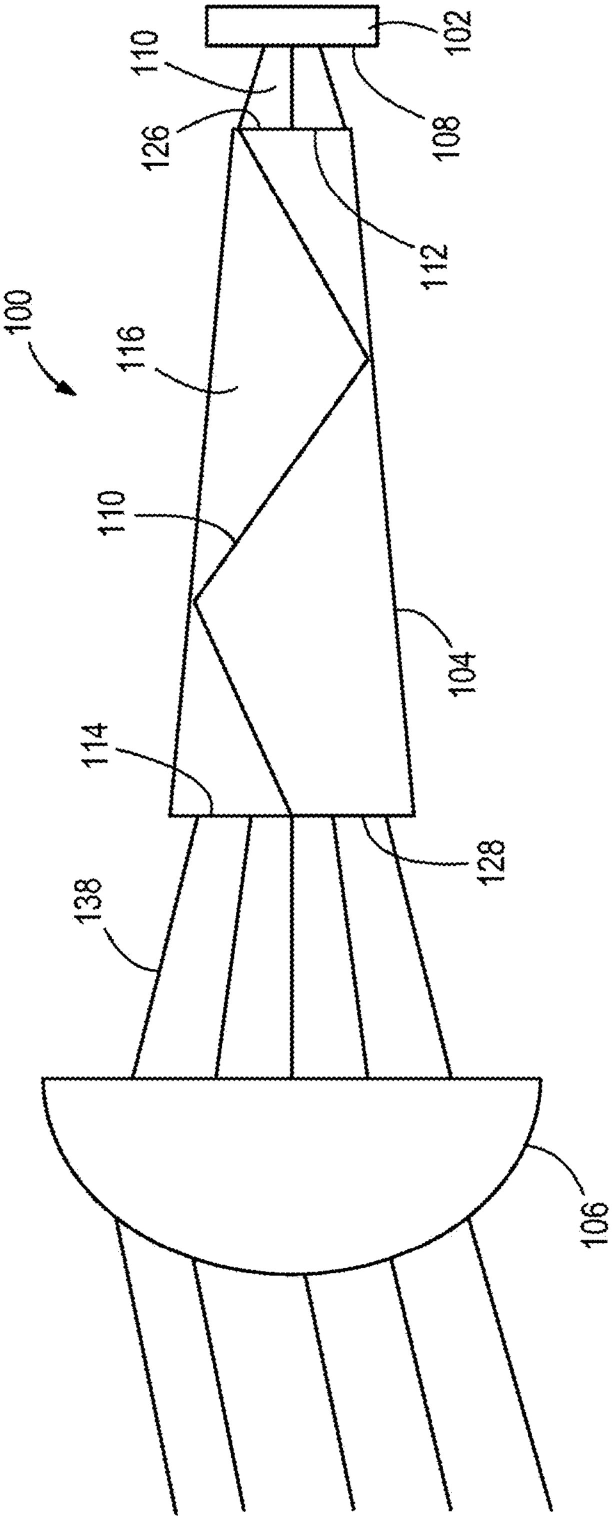
FIG. 3 is a side cross sectional view of the vehicle headlight system according to one embodiment of the present invention
Figure 4:
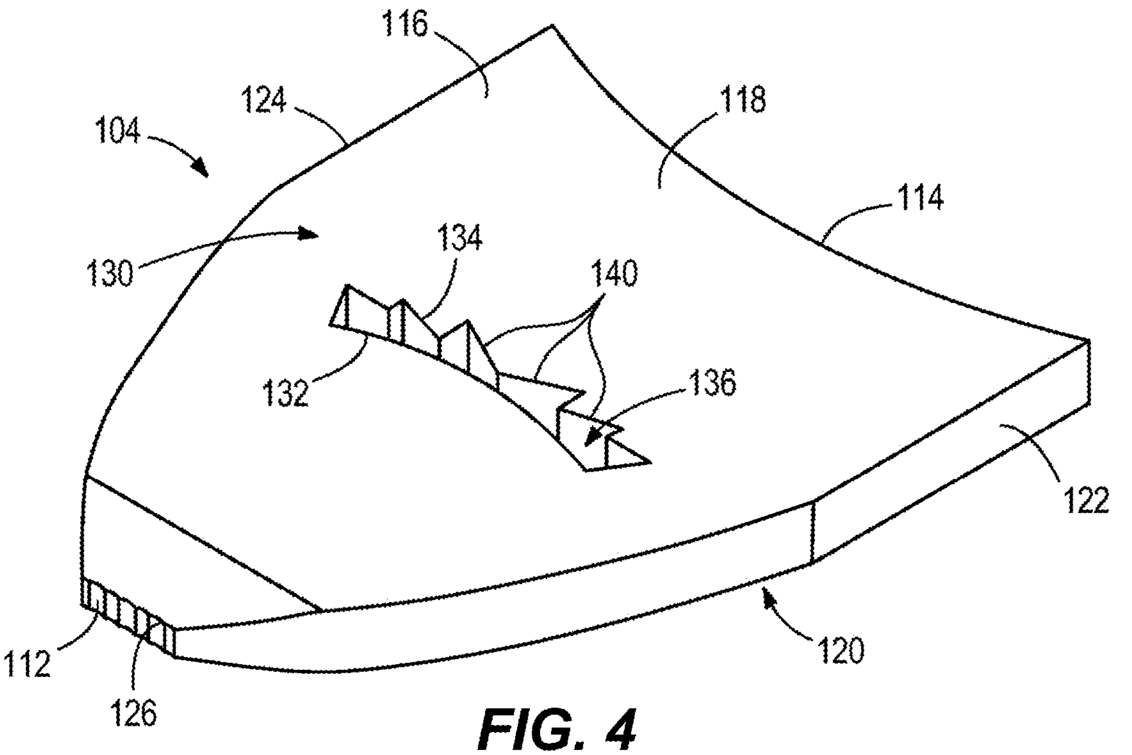
FIG. 4 is a rear top perspective view of a waveguide according to one embodiment of present invention configured for use in a vehicle headlight.
Figure 5:
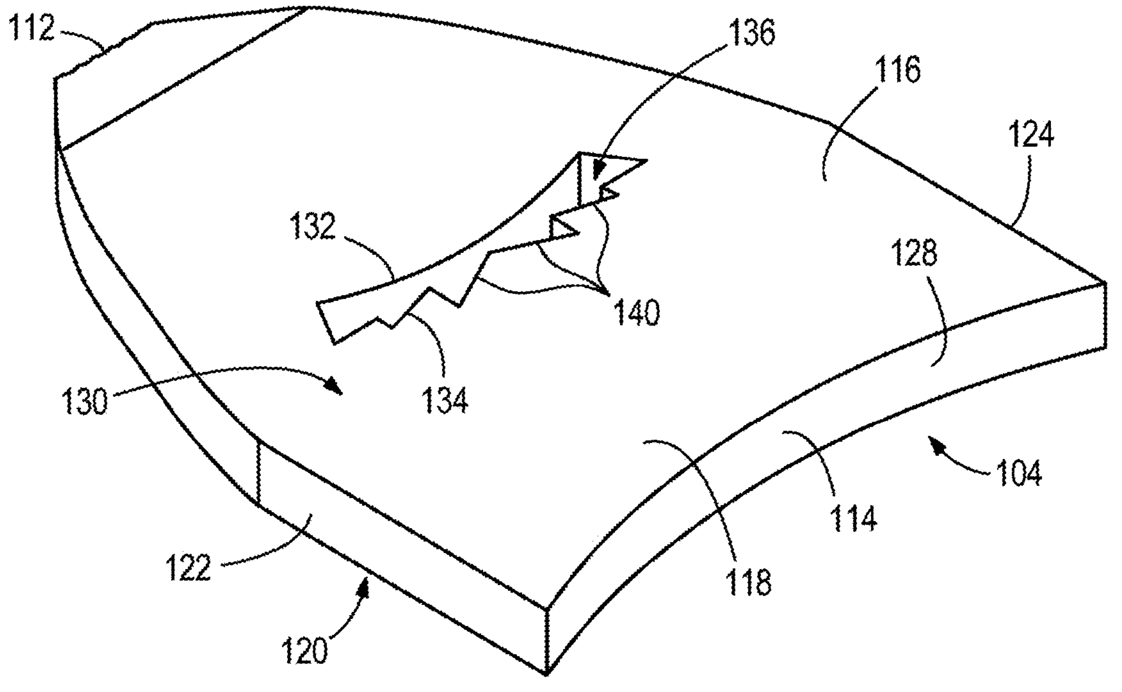
FIG. 5 is a front top perspective view of the waveguide shown in FIG. 4.

Turning now to FIGS. 3-5, and initially FIG. 3, a vehicle lighting system 100 according to one embodiment of the present invention includes an LED light source 102, a waveguide 104, and a projection lens 106. The LED light source 102 may be a single light emitting diode (LED) or an array of LEDs arranged in a planar configuration. A state-of-the-art automotive LED array, for instance, may have a total emitting surface in the range of 0.5-5.0 $mm^2$. As opposed to conventional halogen or xenon vehicle headlamp bulbs 12, the emitting surface 108 of the LED light source 102 is a flat, i.e., two-dimensional, surface emitter 108, which emits light 110 predominantly in a forward-facing direction as opposed to about an arcuate surface of a curved bulb. Accordingly, the lack of light emissions about a curved or arcuate surface lessens the need for a conical reflector, such as the parabolic reflector 14, 22 or elliptical reflector 24 utilized in prior vehicle headlamps.

Turning now to the waveguide 104, the waveguide 104 extends from a first end 112 that is configured to receive input light 110 emitted from the LED light source 102 to an opposing second end 114 that is configured to output light 110 to the projection lens 106. The body 116 of the waveguide 104 extends along a longitudinal axis from the first end 112 to the opposing second end 114 and generally defines a pathway through which the light 110 travels towards the second end 114. The wave guide 104 may be formed of a highly transparent polymer material, for example polycarbonate (PC) or polymethyl methacrylate (PMMA), with a typical refractive index of 1.35-1.60, which is well suited for the internal reflection of light traveling from first end 102 to the second end 112.

Turning now to FIGS. 4 and 5, in which a detailed embodiment of the waveguide 104 according to one embodiment of the present invention is shown, the body 116 may further comprise a top 118, a bottom 120, and right and left sides 122, 124. The waveguide 104 is generally a planar structure that may have a thickness of between 2.0 and 10.0 millimeters, and a length of between 10.0 and 100.0 millimeters. However, it should be understood that any combination or variation of thickness and length, and selected to provide the desired shaping of the emitted light 110 as will be described in further detail below, are well within the scope of the present invention. As shown in FIGS. 3-5, the right and left sides 122, 124 and the top and bottom of the waveguide 104 are not parallel, but rather flared outwardly from the first end 112 towards the opposing second end 114 such that the waveguide 104 may form a general "V" shape, having a second end 114 of greater length than the first end 112, while simultaneously maintaining internal reflection and/or total internal reflection of the light traveling through the body 116 until being emitted from the second end 114. Furthermore, the thickness of the waveguide 104 may also increase from the first end 112 towards the second end 114. As described in further detail below, variation in the width and thickness of the waveguide 104 along the length of the body 116 in order to achieve a desired shaping of the emitted light 110 is well within the scope of the present invention.

Still referring to the waveguide 104, the first end 112 defines an input surface 126 that is configured to receive light 110 from the LED light source 102. The input surface 126 may be configured to physically contact or nearly abut the surface emitter 108 of the LED light source 102, so as to optimize coupling efficiency from LED to waveguide and direct a greater portion of the emitted light 110 into the waveguide 104. Once received at the input surface 126, the light transmits through the body 116 of the waveguide 104 towards the output surface 128 disposed about the second end 114. While traveling through the body 116 of the waveguide 104, all or most of the light may reflect off the top 118, bottom 120, and right and left sides 124, 126. Given that the atmosphere surrounding the waveguide 104 is a less optically dense material, i.e., one with a lower refractive index than that of the waveguide 104, when the angles of incidence are larger than the critical angle, as defined by Snell's law, total internal reflection will occur such that a reflective or partially reflective coating need not be applied to the outer surfaces of the waveguide 104 in order to reflect light across its internal body 116 towards the output surface 128.

Still referring to the waveguide 104, as shown in FIGS. 4 and 5, a lens assembly 130 may be positioned within the body 116 of the waveguide 104. The lens assembly 130 may comprise both a collector lens 132 and redistributor surface 134 disposed on opposing sides of a void 136 located within the body 116. In combination with the surfaces of waveguide 104, the lens assembly 130 is configured to shape the light 110 into a desired light output pattern 138 that is emitted from the output surface 128. The lens assembly 130 furthermore may form relative areas of higher and lower light intensity within the desired output pattern 138. That is to say that the lens assembly 130 both shapes the configuration and asymmetrically or variably alters the intensity of light within the output light pattern 138. More specifically, the collector lens 132 is configured to collimate and collect the light 110 as it travels along the longitudinal plane of the waveguide 104. Once collected and collimated, the light 110 travels across the void 136 where it is then received by redistribution surface 134. As shown in FIGS. 4 and 5, the redistribution surface 134 may include a plurality of linear portions or planar segments 140 of refracting surfaces. The respective length, thickness, surface area, and orientation along both the transverse and fontal planes, i.e., perpendicular to the longitudinal axis of the waveguide 104, of each individual segment 140 of the redistribution surface 134 alters the resultant shape of the desired light output pattern 138 that is emitted from the output surface 128. Furthermore, the asymmetrical amount of light provided to each segment 140, as a function of one or more parameters of the collector lens 132, e.g., focal length, may further impact the relative intensity of light within given portions of the light output pattern 138.

Turning now to the projector lens 106 of the vehicle lighting system 100, as shown in FIG. 3, the projector lens 106 is configured to receive the light output pattern 138 from the output surface 128 located at the second end 114 of the waveguide 104. The light output pattern 138, which may be a low beam, high beam or extended high beam pattern, is projected outwardly and downwardly onto the roadway through the projection lens 106. As a result of the compact LED light source 102, which may include one or more LEDs positioned on a printed circuit board (PCB), and a waveguide 104 having a length of between typically 10 and 100 millimeters, the light output pattern 138 from the output surface 128 located at the second end 114 of the waveguide 104 is narrowly contained. Accordingly, the lens diameter of the projector lens 106 can be reduced to a distance of between 10.0 and 100.0 millimeters with a focal length also of between 10.0 and 100.0 millimeters. In totality, the relatively small diameter projection lens 106, combined with a thin LED light source 102 and relatively short waveguide 104, results in a vehicle lighting system 100 that is substantially more compact than a traditional vehicle light that utilized a halogen bulb 12 and reflector 14, 22, 24.

Furthermore, the relatively minimal thickness of the waveguide 104, of between 1.0 and 10.0 millimeters, allows for the compact stacking of multiple waveguides 104 within an alternative embodiment of the present invention. More specifically, in one alternative embodiment of the vehicle lighting system 200 according to the present invention, as shown in FIGS. 6-14, the system 200 may comprise a first waveguide 200B, a second waveguide 200B, and a third waveguide 200C or 200D that are utilized in combination with either a common or discrete LED light source 202 and a common projection lens 206. In the following description it should be understood that system 200 is generally similar to the previously described system 100, and that like features are identified by like reference characters that have been adjusted to begin with the number "2" in the hundreds place, but for the primary substitution of the waveguide 104 with the first waveguide 204A, a second waveguide 200B, and a third waveguide 200C or 200D.

Turning now to FIGS. 6-15, in system 200 the first waveguide 200A may be configured to emit a first light pattern 238A that corresponds to a low beam light pattern, a second waveguide 204B may be configured to emit a second light pattern 238B that corresponds to a high beam light pattern, and a third waveguide 204C or 204D that may be configured to emit a third light pattern 238C that corresponds to an extended high beam light pattern. More specifically, as was described above, the lens assembly 230 disposed within one or more of the respective waveguides 214A, 214B, 214C, 214D is configured to shape the light 210 into desired light output patterns 238A, 238B, 238C, 238D that are emitted from the corresponding output surfaces 228A, 228B, 228C, 228D. A representation of the corresponding light output patterns 238A, 238B, 238C, 238D of system 200 is shown in FIG. 15A-15C in which the profile of the first light pattern 238A may be controlled as to conform to regulatory requirements through the shaping of the respective waveguide 204A. More specifically, a first light pattern 238A may selectively reduce illumination of the left side of a vehicle driver's field of view at a distance greater than approximately 30 meters from the vehicle so as to lessen illumination of the oncoming traffic across a roadway centerline. Similarly, as shown in FIG. 15C, the profile of the second light pattern 238B and third light pattern 238C, 238D may be controlled so as to conform to regulatory requirements through the shaping of the respective waveguide 204B, 204C, and 204D respectively. More specifically, a second light pattern 238B, which is a high beam light pattern that respectively incorporates the first light pattern 238A therein, may provide additional illumination at an elevated height above the roadway at a distance from the vehicle of approximately 15-40 meters, while selectively tapering the high beam illumination of both the left and right side of a vehicle driver's field of view at a distance greater than approximately 30 meters from the vehicle so as to focus high beam illumination on the area ahead of the vehicle as shown in FIG. 15A-15C. Similarly, the third light pattern 238C, 238D which is an extended high beam light pattern preferably of considerably higher intensity than the second light pattern 238B, that respectively incorporates the first light pattern 238A and high beam light pattern 238B therein, may provide additional illumination when the head light is a high-mounted headlight, having an elevated height of approximately 2.0 to 3.5 meters above the roadway and a downward tilt angle of approximately 4.0 to 7.0 at a distance from the vehicle greater than 30 meters, while selectively tapering the high beam illumination of both the left and right side of a vehicle driver's field of view at a distance greater than approximately 30 meters but less than 75 meters from the vehicle so as to direct the high beam illumination on the area ahead of the vehicle as shown in FIG. 15A-15C.

Figure 6:
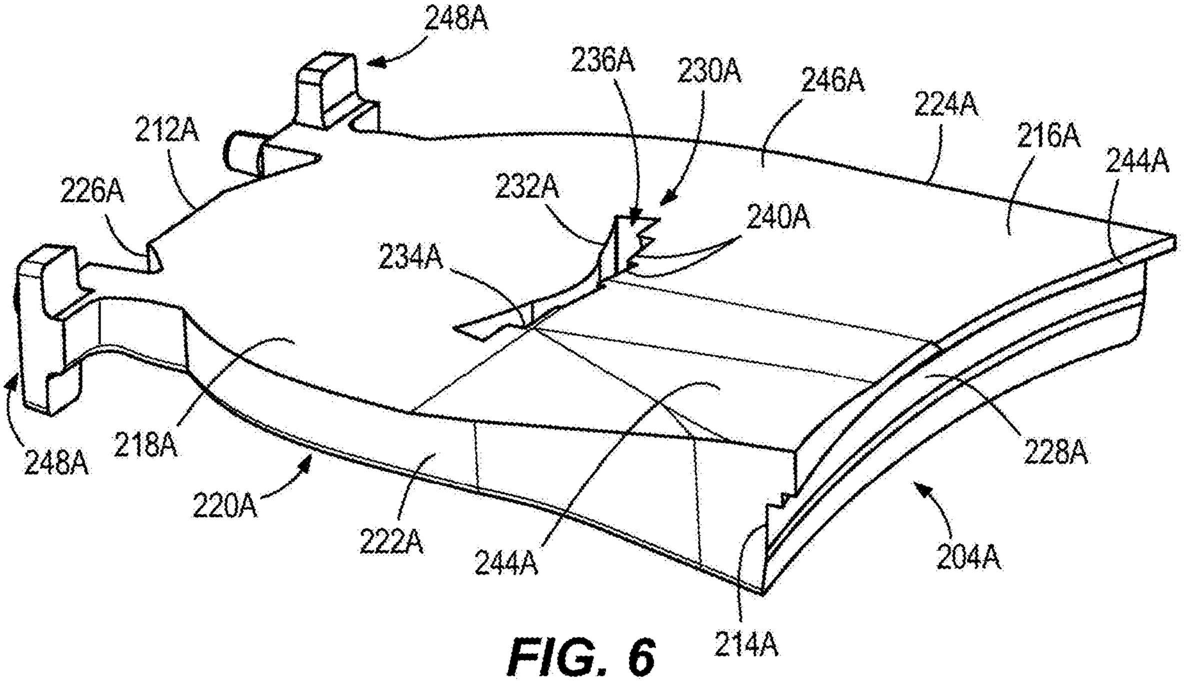
FIG. 6 is a front top perspective view of a low beam waveguide according to one embodiment of present invention configured for use in a vehicle headlight.
Figure 7:
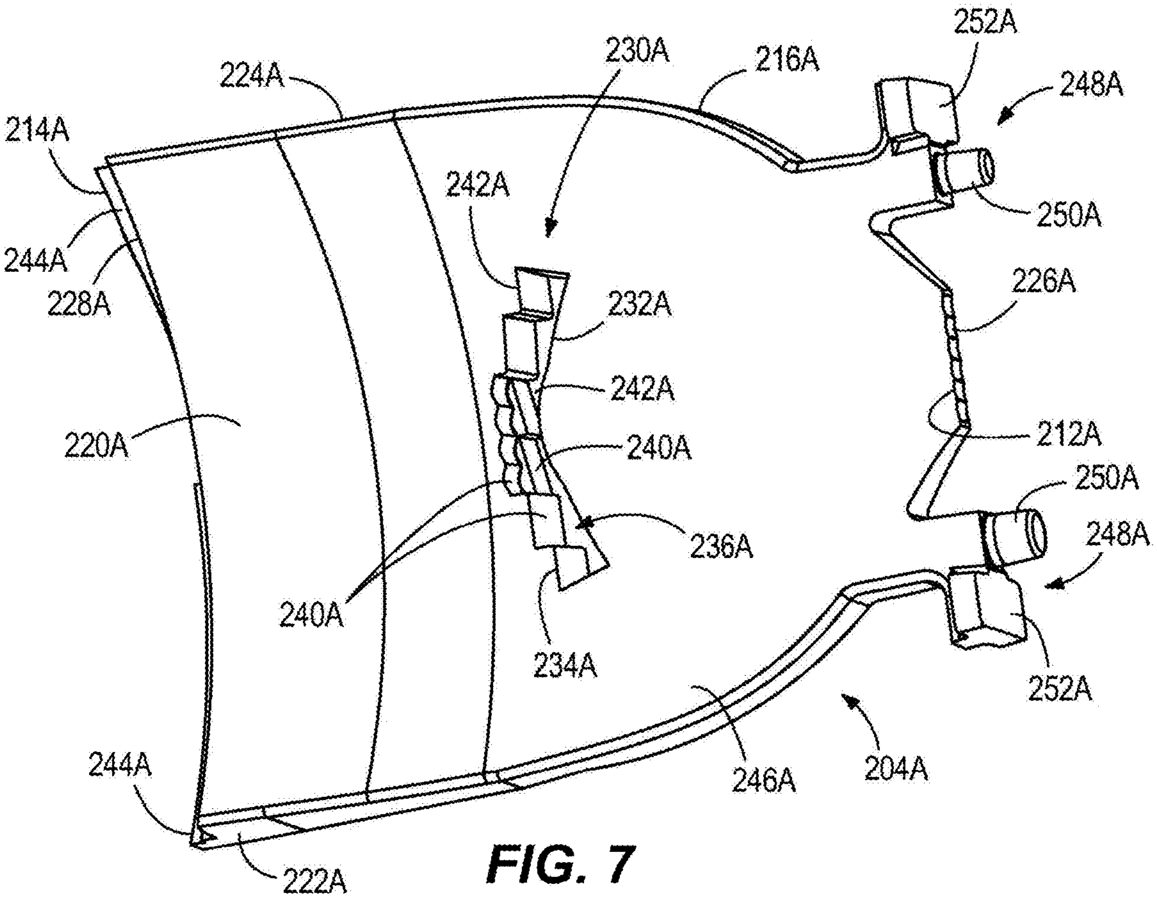
FIG. 7 is a bottom perspective view of the low beam waveguide shown in FIG. 6.

Still referring to FIGS. 6-14, and more specifically FIGS. 6 and 7, the first waveguide 204A is configured for use when generating vehicle low beam lighting, while the second waveguide 204B is configured for use, either independently or in combination with the first waveguide 204B, when generating vehicle high beam lighting, and the third waveguide 204C/204D is configured for use, either independently or in combination with the first waveguide 204A and/or second waveguide 204B, when generating vehicle extended high beam lighting. The first waveguide 204A contains the features as were described above in the description of waveguide 104, including a first end 212A that is configured to receive input light 210 emitted from the LED light source 202 to an opposing second end 214A that is configured to output light 210A in the form of the light pattern 238A from a second end 214A to a projection lens 206. The body 216A of the waveguide 204A extends along a longitudinal axis from the first end 212A to the opposing second end 214A and generally defines a pathway through which the light 210 travels towards the second end 214A. The body 216A may further comprise a top 218A, bottom 220A, and right and left sides 222A, 224A. The first end 212A defines an input surface 226A that is configured to receive light 210 from the LED light source 202. The input surface 226A may be configured to physically contact or nearly abut the surface emitter 208 of the LED light source 202, so as to direct a greater portion of the emitted light 210 into the waveguide 204A. Positioned within the body 216A of the waveguide 204A is a lens assembly 230A. The lens assembly 230A may comprise both a collector lens 232A and a redistributor surface 234A disposed on opposing sides of a void 236A located within the body 216A, as was described in the preceding discussion of system 100.

Still further, in one embodiment of the present invention, as shown in FIGS. 6 and 7, the first light pattern 238A may be further modified by the redistribution surface 234A comprised of a plurality of linear portions or planar segments 240A. More specifically, segments 240A may have a height less than that of the body 216A, such that one or more discrete rows 242A of segments 240A may be incorporated into the redistribution surface 234A in the lens assembly 230A. That is to say that a segment 240A of the redistribution surface 234A need not extend the full width of the body 216A of the waveguide 204A. For example, as seen in FIG. 7, the segments 240A may have a thickness or depth less than that of the body 216A, such that multiple segments 240A are stacked atop one another as to provide for yet further customization of the first light pattern 238A about its vertical axis as it is output from the waveguide 204A. As described above, such customization of the output light pattern 238A is particularly significant in the context of compliance with applicable vehicle safety regulations.

Furthermore, as is shown in FIGS. 6 and 7, it should be noted that the first waveguide 204A has a width greater than that of the second waveguide 204B and the third waveguide 204C/204D. The increase in relative width of the first waveguide 204A corresponds to its relatively larger light output surface 228A at the second end 214A, opposite the LED light source 202. The increase in the light output surface 228A correlates to the wider area of roadway illumination exhibited by the vehicle's corresponding low beam or first light pattern 238A, as discussed above.

In addition to its relatively greater width, first waveguide 204A, as shown in FIGS. 6 and 7, may also exhibit one or more asymmetrical extensions or protrusions 244A about the outer surface 246A of any one or more of its relative sides 218A, 220A, 222A, 224A and/or output surface 228A. By way of nonlimiting example, the low beam waveguide 204A may include a bulbous projection or protrusion 244A of its outer surface 246A positioned along the top 218A adjacent a side 220A, which corresponds to a medial portion of the low beam or first light pattern 238A for a system 200 mounted in a left headlamp position. The protrusion 244A generally exhibits an increase in thickness relative to the body 216A of first waveguide 204A. Resultantly, the corresponding low beam light output pattern 238A may have greater height towards its medial portion, and relatively less height along its opposing perimeters or distal portion. In another nonlimiting embodiment, the first waveguide 204A may also include a protrusion 244A extending along a top edge of the second end 214A at the light output surface 228A, generally in the configuration of a shroud as shown in FIGS. 5 and 6.

In addition to the protrusions 244A present about the second end 214A, the first waveguide 204A may further include one or more mounting extensions 248A extending outwardly from opposing first end 212A as to allow the first waveguide 204A to be securely fastened to the LED light source 202, as will be described in further detail below. In one non-limiting embodiment the mounting extensions 248A generally include pegs 250A configured to be received within apertures of mounting surface upon which the LED light source 202 is positioned, and/or feet 252A configured to engage the mounting surface upon which the LED light source 202 is positioned. As shown in FIG. 7, the opposing pegs 250A may have different circumferences, as to allow the first waveguide 204A to be properly indexed, i.e., ensure that the top 218A is positioned upwardly, during assembly of the system 200.

Figure 8:
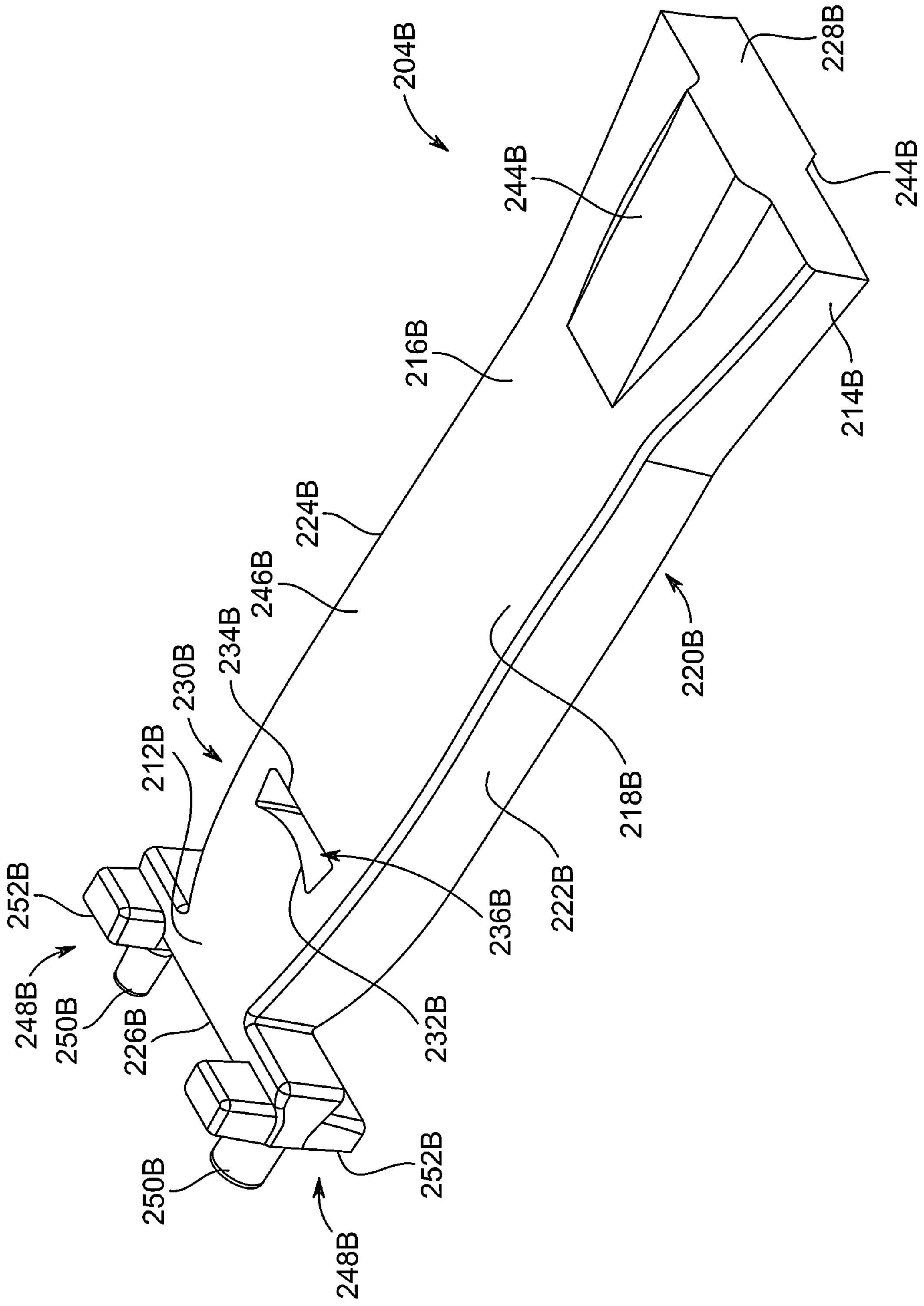
FIG. 8 is a front top perspective view of a high beam waveguide according to one embodiment of present invention configured for use in a vehicle headlight.
Figure 15A:
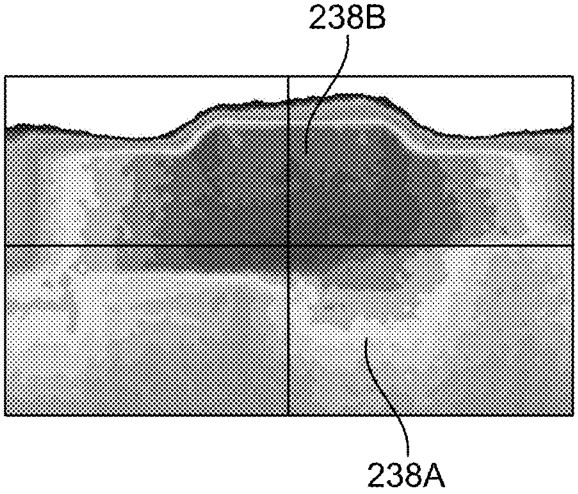
FIG. 15A is a front elevation view of a light emission profile from a head light mounted at a standard passenger vehicle height, emitting both a low beam light pattern and a high beam light pattern.
Figure 15B:
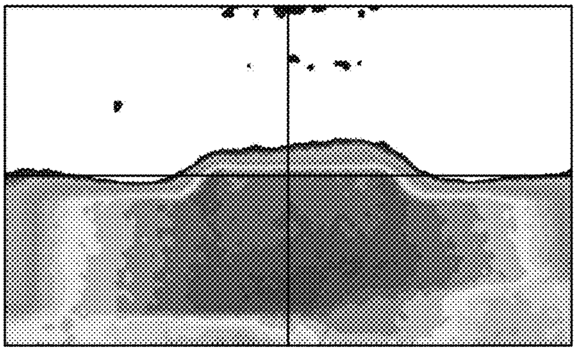
FIG. 15B is a front elevation view of a light emission profile from a high-mounted head light at a downward tilt angle of approximately 4.0°, emitting both a low beam light pattern and a high beam light pattern; and, FIG. 15C is a front elevation view of a light emission profile from a high-mounted head light of FIG. 14 at a downward tilt angle of approximately 4.0°, emitting a low beam light pattern, a high beam light pattern, and an extended high beam light pattern.
Figure 15C:
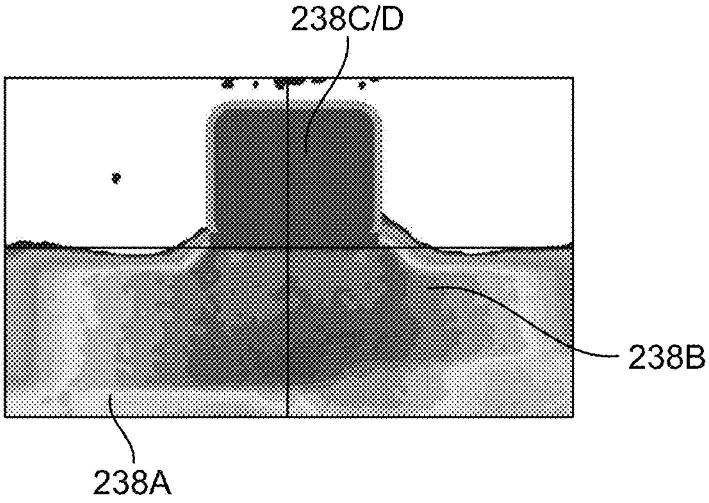

Turning now to FIG. 8, the second waveguide 204B of system 200 is shown in isolation, and described in further detail below. As was described, the second waveguide 200B may be configured to emit a second light pattern 238B that corresponds to a high beam light pattern in system 200. More specifically, the lens assembly 230B disposed within the second waveguide 214B is configured to shape the light 210 into a desired light output pattern 238B that is emitted from the corresponding output surface 228B. A representation of the corresponding light output patterns 238B of the second waveguide 204B is shown in FIG. 15A in which the profile of the second light output pattern 238B may be controlled as to conform to regulatory requirements through the shaping of the respective waveguide 204B. More specifically, the second light pattern 238B, which is a high beam light pattern that respectively incorporates the first light pattern 238A therein, may provide additional illumination at an elevated height above the roadway a distance from the vehicle greater than 30 meters, while selectively tapering the high beam illumination of both the left and right side of a vehicle driver's field of view at a distance greater than approximately 30 meters from the vehicle so as to focus high beam illumination on the area ahead of the vehicle.

Still referring to FIG. 8, the second waveguide 204B is configured for use when generating vehicle high beam lighting, either independently or in combination with the first waveguide 204A. The second waveguide 204B generally contains the features as were described above in the description of waveguide 104, and first waveguide 204A, including a first end 212B that is configured to receive input light 210 emitted from the LED light source 202 to an opposing second end 214B that is configured to output light 210B in the form of the light pattern 238B from a second end 214B to a projection lens 206. The body 216B of the waveguide 204B extends along a longitudinal axis from the first end 212B to the opposing second end 214B and generally defines a pathway through which the light 210 travels towards the second end 214B. The body 216B may further comprise a top 218B, bottom 220B, and right and left sides 222B, 224B. The first end 212B defines an input surface 226B that is configured to receive light 210 from the LED light source 202. The input surface 226B may be configured to physically contact or nearly abut the surface emitter 208 of the LED light source 202, so as to direct a greater portion of the emitted light 210 into the waveguide 204B. Positioned within the body 216B of the waveguide 204B is a lens assembly 230B. The lens assembly 230B may comprise both a collector lens 232B and redistributor surface 234B disposed on opposing sides of a void 236B located within the body 216B, as was described previously.

Still further, in one embodiment of the present invention, not shown, it should be understood that the second light pattern 238B may be further modified by the redistribution surface 234B comprised of a plurality of linear portions or planar segments, and more specifically segments that have a height less than that of the body, such that one or more discrete rows of segments may be incorporated into the redistribution surface 234B in the lens assembly 230B. That is to say that a given segment of the redistribution surface 234B need not extend the full width of the body 216B of the waveguide 204B. For example, the segments may have a thickness or depth less than that of the body 216B, such that multiple segments are stacked atop one another as to provide for yet further customization of the second light pattern 238B about its vertical axis as it is output from the waveguide 204B.

Furthermore, as is shown in FIG. 8, it should be noted that in contrast to the first waveguide 204A, the second waveguide 204B has a relatively narrower width than that of the width of low beam waveguide 204A. The relative decrease in the width of the high beam or second waveguide 204B, as shown in FIG. 8, correlates to its relatively smaller light output surface 228B at its corresponding second end 214B, opposite the LED light source 202. This relative decrease in the light output surface 228B of the second waveguide 204B correlates to the narrower area of roadway and/or surrounding illumination exhibited by the vehicle's corresponding high beam light pattern 238B, as shown in FIG. 15A.

In addition to its relatively narrower width, second waveguide 204B, as shown in FIG. 8, may also exhibit one or more asymmetrical extensions or protrusions 244B about the outer surface 246B of any one or more of its relative sides 218B, 220B, 222B, 224B and/or output surface 228B. By way of nonlimiting example, the high beam waveguide 204B may include a bulbous projection or protrusion 244B of its outer surface 246B centrally positioned along the top 218B adjacent the output surface 228B, which corresponds to a central portion of the high beam or second light pattern 238B for a system 200 mounted in a left headlamp position. The protrusion 244B generally exhibits an increase in thickness relative to the body 216B of first waveguide 204B. Resultantly, the corresponding high beam light output pattern 238B may have greater height towards its central portion, and relatively less height along its opposing perimeters or distal portions. Additionally, in another nonlimiting embodiment, the second waveguide 204B may also include a protrusion 244B extending along the bottom 220B at a side 224B, which when mounted together with the first waveguide 204A, will form a mating or complementary engagement with the protrusion 224A located on the top 218A of the first waveguide 204A.

In addition to the protrusions 244B present about the second end 214B, the second waveguide 204B may further include one or more mounting extensions 248B, as shown in FIG. 8, extending outwardly from opposing first end 212B as to allow the second waveguide 204B to be securely fastened to the LED light source 202, as will be described in further detail below. In one non-limiting embodiment the mounting extensions 248B generally include pegs 250B configured to be received within apertures of mounting surface upon which the LED light source 202 is positioned, and/or feet 252B configured to engage the mounting surface upon which the LED light source 202 is positioned. As shown in FIG. 8, the opposing pegs 250B may have different diameters or shapes as to allow the second waveguide 204B to be properly indexed, i.e., to ensure that the top 218B is positioned upwardly during assembly of the system 200.

Figure 9:
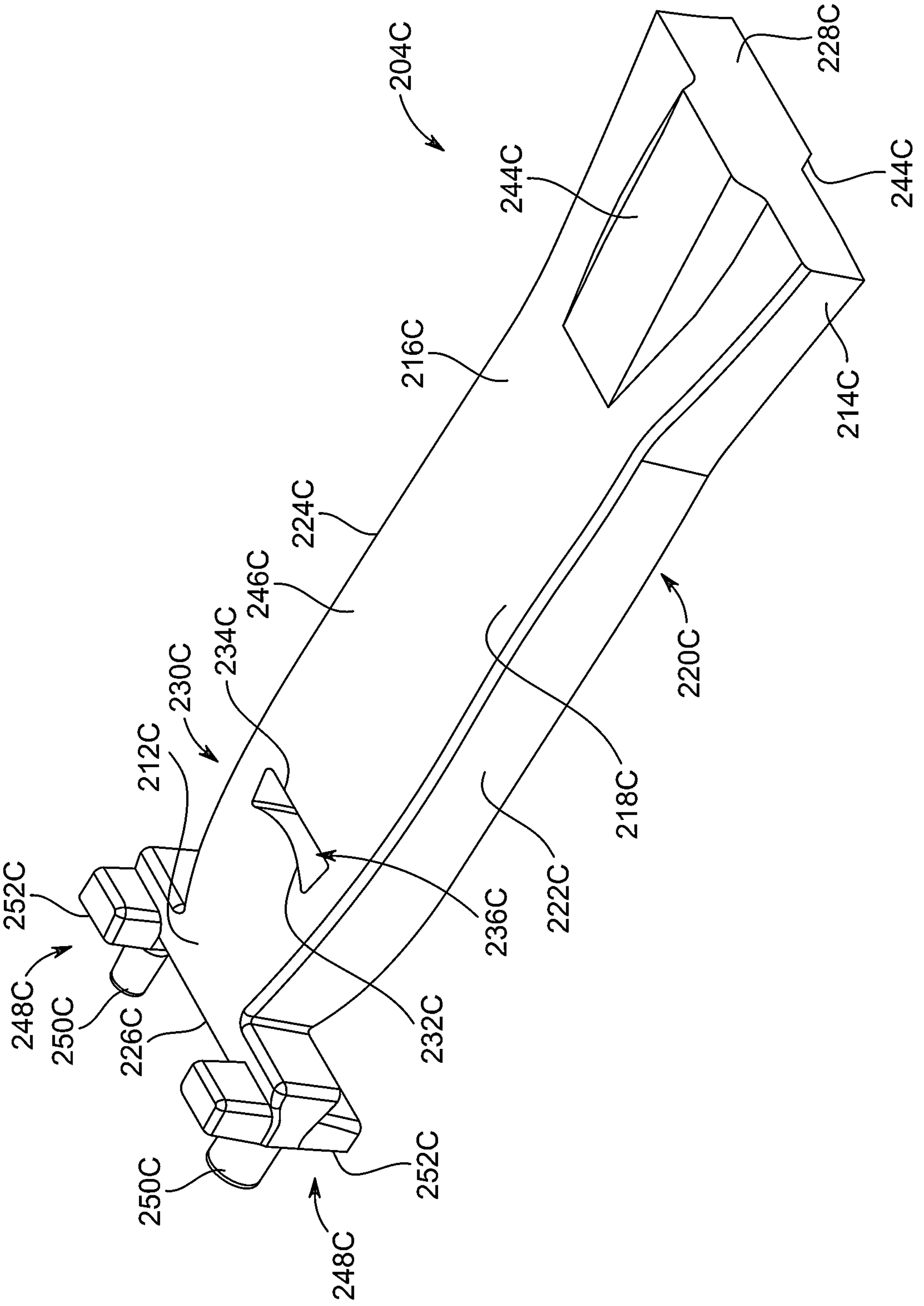
FIG. 9 is a front top perspective view of an extended high beam waveguide according to a first embodiment of present invention configured for use in a vehicle headlight.

Turning now to FIG. 9, one embodiment of the second waveguide 204C of system 200 is shown in isolation. It should be understood that in one embodiment, the third waveguide 204C is generally similar to the previously described second waveguide 204B, and that like features are identified by like reference characters that have replaced the letter designation "B" in the second wave guide 204B with "C" in the third wave guide 204C. Accordingly, a repetition of the common features of the third waveguide 204C is not expressly included herein, but it should be understood that the preceding description of the second waveguide 204B and its features identified by reference numbers ending in the letter designation "B" are equally applicable to the third waveguide 204C and its features identified by similar reference numbers ending in the letter designation "C" in FIG. 9.

Figure 10:
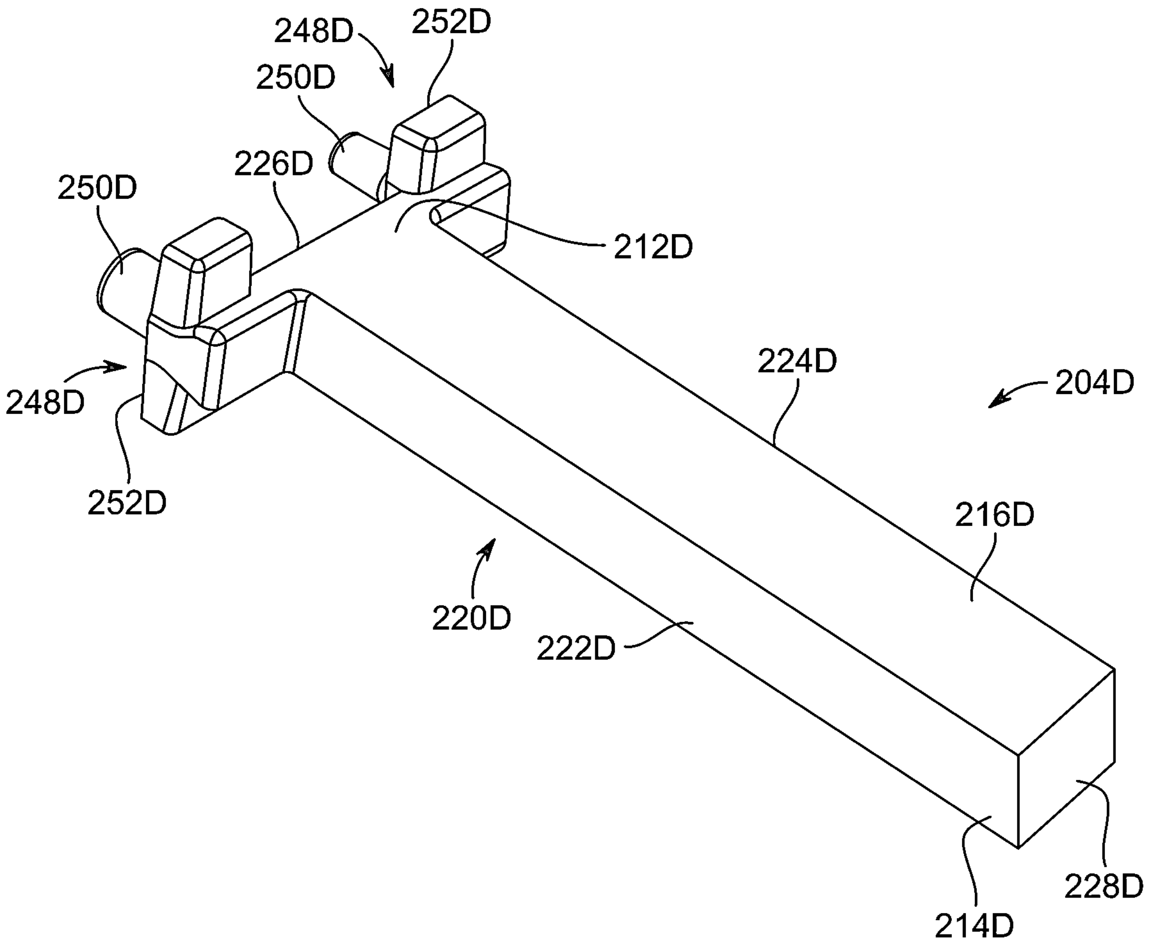
FIG. 10 is a front top perspective view of an extended high beam waveguide according to a second embodiment of present invention configured for use in a vehicle headlight.

Turning now to FIG. 10, another embodiment of the third waveguide 204D of system 200 is shown in isolation. It should be understood that in one embodiment, the third waveguide 204D is generally similar to the previously described third wave guide 204C and second waveguide 204B, and that like features are identified by like reference characters that have replaced the letter designation "C" in the third wave guide 204C with "D" in the third wave guide 204D. Accordingly, a repetition of the common features of the third waveguide 204D is not included herein, but it should be understood that the preceding description of the second waveguide 204B and its features identified by reference numbers ending in the letter designation "B" are equally applicable to the third waveguide 204D and its features identified by reference numbers ending in the letter designation "D" in FIG. 9.

Of notable distinction, the third waveguide 204D may have a body 216D that is generally polygonal in shape, and more specifically a rectangular prism or cuboid shape. The third waveguide 204D may be formed with a slight curvature or radius along its longitudinal axis. As shown in FIG. 10, in one representative embodiment, the body 216D may further comprise a top 218D, bottom 220D, and right and left sides 222D, 224D that generally intersect at approximately right angles. The first end 212D of the body 216D defines an input surface 226D that is configured to receive light 210 from the LED light source 202. Furthermore, third waveguide 204D may be devoid of a lens assembly that corresponds to the lens assembly 230A, 230B, 230C, that is or may be present in the corresponding first waveguide 204A, second waveguide 204B, or third waveguide 204C. Accordingly, light 210 travels through the body 216D and is emitted from the corresponding output surface 228D into a desired light output pattern 238C/238D that is emitted from the corresponding output surface 228D at the second end 214D. In one embodiment, the relatively narrow body 216D of third waveguide 204D, and its corresponding end 214D are polygonal as to confine the emitted light pattern 238D corresponding to the extended high beam light to the roadway.

In addition to its relatively narrower width, it should be understood that the generally polygonal body 216D of the third waveguide 204D may be combined with any one or more asymmetrical extensions or protrusions 244C, as were shown in the alternative embodiment of the third waveguide 204C in FIG. 9. This includes but is not limited to those protrusions 244C that are configured to alter or modify the emitted light pattern 238C/238D, as well as those that might extend along the bottom 220D which, when mounted together with the second waveguide 204B, will facilitate a mating with the protrusion 224B located on the top 218B of the second waveguide 204B so as to form an uninterrupted emitted light pattern.

Figure 11:
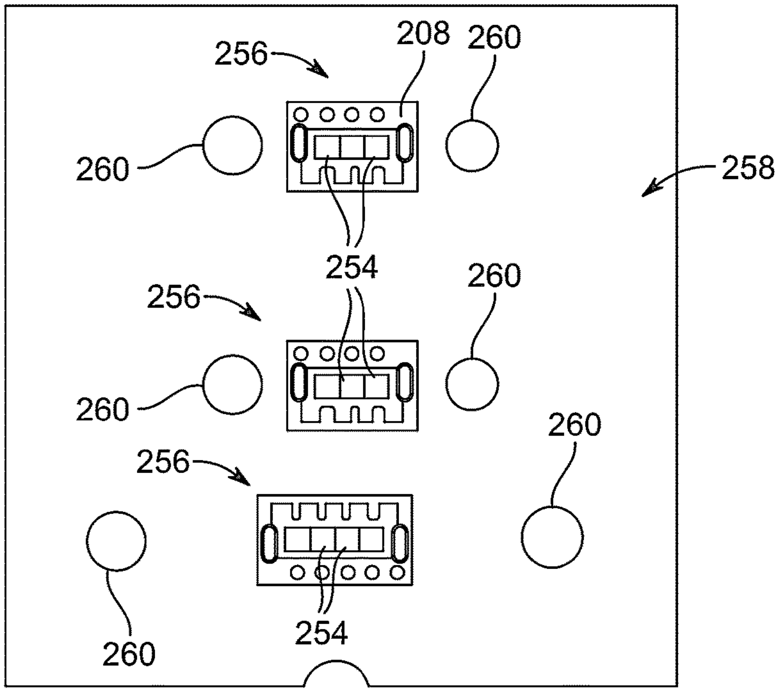
FIG. 11 is a front elevation view of a low beam, a high beam and an extended high beam LED array affixed to a mounting surface configured to receive the low beam waveguide of FIG. 6, the high beam waveguide of FIG. 8, and the extended high beam waveguide of either FIG. 9 or 10.

Referring now to FIGS. 11-14, and initially FIG. 11, the LED light source 202 of system 200 is shown and described in further detail below. The LED light source 202, according to one embodiment of the present invention includes light emitting surfaces 208 associated with each of the input surfaces 226A, 226B, 226C of the first, second and third waveguides 204A, 204B, 204C/204D, respectively. The light emitting surfaces 208 may include one or more individual LEDs 254 or an array 256 thereof. By way of the non-limiting example shown in FIG. 11, the light emitting surface 208 corresponding to the input surface 226A of the first waveguide 204A may include an array 256 of four individual LEDs 254, the light emitting surface 208 corresponding the input surface 226B of the second waveguide 204B may include an array 256 of three individual LEDs 254, while the light emitting surface 208 corresponding the input surface 226C or 226D of the third waveguide 204C or 204D may include an array 256 of three or more individual LEDs 254. The LED light source 202 further comprises a mounting surface or plate 258 upon which the light emitting surfaces 208 are secured, and apertures 260 disposed therein are configured to receive the pegs 250A, 250B, 250C/250D for mounting the waveguides 204A, 204B, 204C/204D to the LED light source 202. More specifically, the apertures 260 may have different diameters or shapes as to allow the first, second and third waveguides, 204A, 204B, 204C/204D to be properly indexed, i.e., positioned and oriented, during assembly of the system 200.

Figure 12:
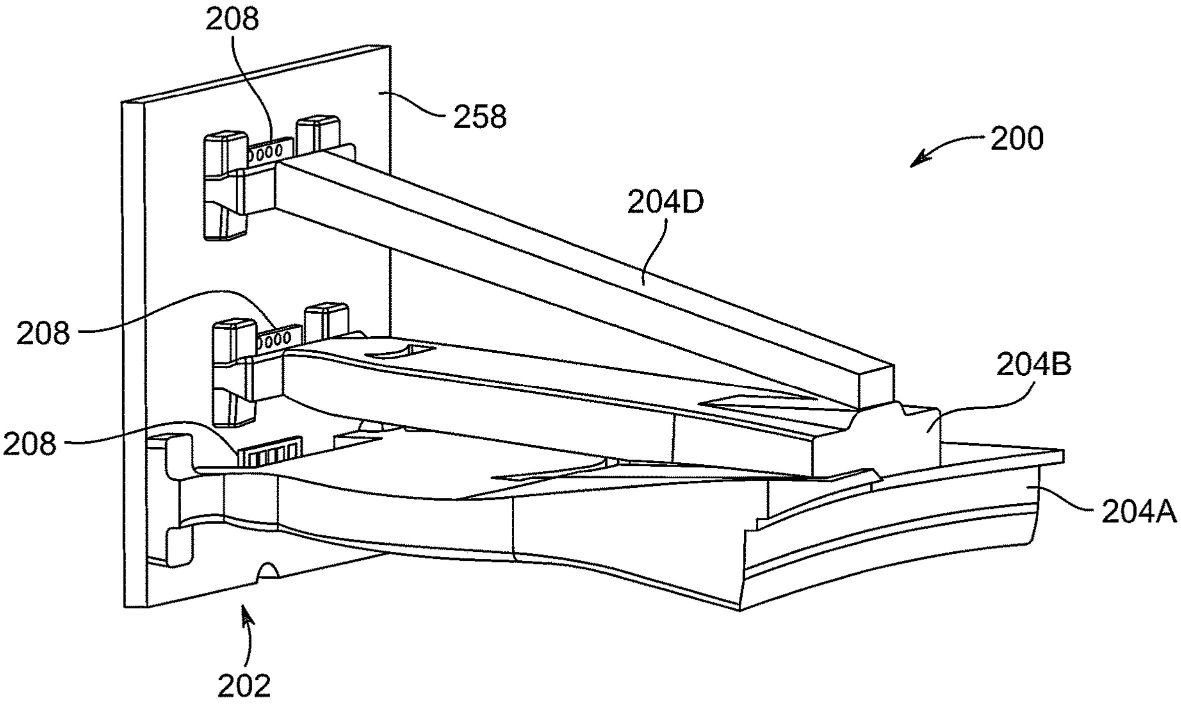
FIG. 12 is a front top perspective view of a vehicle headlight assembly according to one embodiment of the present invention, including a low beam waveguide, high beam waveguide, one embodiment of the extended high beam waveguide and corresponding LED arrays.
Figure 13:
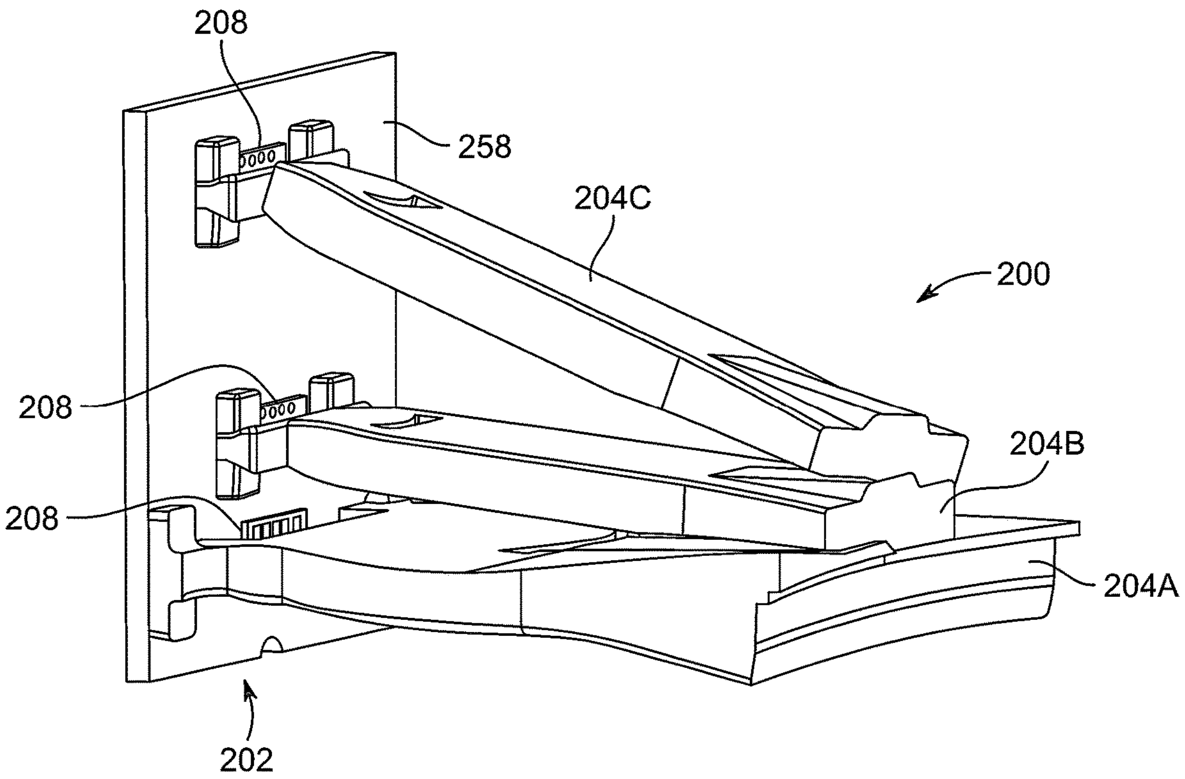
FIG. 13 is a front top perspective view of a vehicle headlight assembly according to one embodiment of the present invention, including a low beam waveguide, high beam waveguide, an alternative embodiment of the extended high beam waveguide and corresponding LED arrays.
Figure 14:
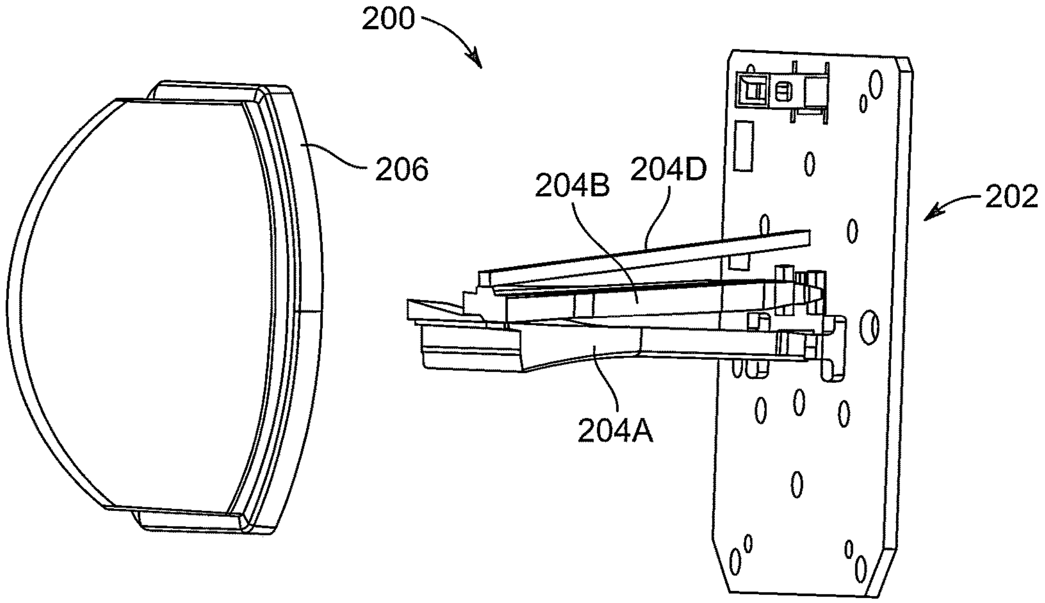
FIG. 14 is a front perspective view of the vehicle headlight assembly of FIG. 12, including a projection lens.

As shown in FIGS. 12 and 13 the combination of waveguides 204A, 204B and 204C or 204D may include additional structural components for further altering both the shape and/or intensity of the light emitted from the system 200. In addition to the protrusions 244A, 244B,244C the top surface 218A of the first waveguide 204A and the bottom surface 220B of the second waveguide 204B may exhibit complementary irregular or asymmetrical surfaces that are complementarily configured to mate and/or align when the second waveguide 204B is positioned above the first waveguide 204A, as are the top surface 218B of the second waveguide 204B and the bottom surface 220C or 220D of the third waveguide 240C or 240D. Such a complementary or mating configuration ensures that when utilized in combination, i.e., when the high beam lights and extended high beam lights are activated, no void or gap is present within the light output pattern 238C/D. While FIG. 13 illustrates the third waveguide 204C as being slightly rotated when positioned on top surface 218B of second waveguide 204B, it is understood that the bottom surface of third waveguide 204C may be modified from the illustrated configuration so as to nest on top surface 218B of second waveguide 204B without any such rotation.

Additionally, in one alternative embodiment not shown, positioning of the waveguides 204A, 204B, 204C or 204D in such close proximity allows for the LED light source 202 to provide a common printed circuit board (PCB) including both light emitting surfaces 208 corresponding to the input surfaces 226A of the first waveguide 204A, the input surfaces 226B of the second waveguide 204B, and the input surfaces 226C/226D of the third waveguide 204C/204D, i.e., all LEDs 254 for the system 200 are provided on a common printed circuit board (PCB). Similarly, the relative proximity of the output surfaces 228A, 228B, 228C or 228D of all waveguides 204A, 204B, 204C or 204D allows for a single common projection lens 206 to be utilized by all waveguides 204A, 204B, 204C or 204D in system 200.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

Various additions, modifications, and rearrangements are contemplated as being within the scope of the following claims, which particularly point out and distinctly claim the subject matter regarding as the invention, and it is intended that the following claims cover all such additions, modifications, and rearrangements.

I claim:

1. A lighting system mounted to a vehicle at an elevated location above an implement associated with the vehicle, comprising:

an LED light source adapted to be mounted to a vehicle, the LED light source configured to emit a light;

a low beam waveguide defining oppositely facing first and second ends and a body therebetween, wherein the low beam waveguide is configured to receive light emitted from the LED light source at the first end and output a low beam light pattern at the second end;

a high beam waveguide defining oppositely facing first and second ends and a body therebetween, wherein the high beam waveguide is configured to receive light emitted from the at least one LED light source at the first end and output a high beam light pattern at the second end;

an extended high beam waveguide defining oppositely facing first and second ends and a body therebetween, wherein the extended high beam waveguide is configured to receive light emitted from the LED light source at the first end and output an extended high beam pattern at the second end, and wherein the extended high beam waveguide is configured such that the extended high beam has a narrower transverse dimension than that of the low beam and high beam light patterns;

wherein the first end of each of the low beam, high beam and extended high beam waveguides is mounted to a common mounting member that includes the LED light source via an aperture and opening mounting arrangement interposed between the common mounting member and the respective waveguide; and at least one projection lens disposed adjacent the second ends of the low beam, high beam and extended high beam waveguides configured to receive the light patterns from the low beam, high beam and extended high beam waveguides and to project the same in front of the vehicle;

wherein the elevated location of the lighting system enables the low beam and high beam light patterns to illuminate areas forwardly of the implement, and enables the extended high beam to illuminate areas forwardly of the areas illuminated by both the low beam and the high beam light patterns.

2. The vehicle lighting system of claim 1, wherein the aperture and opening mounting arrangements of each of the first, second and third waveguides are differently configured relative to each other.

3. A lighting system for a vehicle, comprising:

an LED light source adapted to be mounted to a vehicle, the LED light source configured to emit a light;

a first waveguide defining oppositely facing first and second ends and a body therebetween, wherein the first waveguide is configured to receive light emitted from the LED light source at the first end and output a first light pattern at the second end;

a second waveguide defining oppositely facing first and second ends and a body therebetween, wherein the second waveguide is configured to receive light emitted from the LED light source at the first end and output a second light pattern at the second end, wherein the second light pattern that is emitted from the second end of the second waveguide is differently configured relative to the first light pattern that is emitted by the second end of the first waveguide;

one or more of the first and second waveguides having a refracting surface array disposed within the body of the first and/or second waveguide between the first and second ends, the refracting surface array being configured to shape light received from the LED light source to form the light pattern at the second end of the first and/or second waveguide;

a third waveguide defining oppositely facing first and second ends and a body therebetween, wherein the third waveguide is configured to receive light emitted from the LED light source at the first end and output a third light pattern at the second end, wherein the third light pattern that is emitted from the second end of the third waveguide is differently configured relative to both the first light pattern that is emitted by the second end of the first waveguide and the second light pattern that is emitted by the second end of the second waveguide;

wherein the first end of each of the first, second and third waveguides is mounted to a common mounting member that includes the LED light source; and at least one projection lens disposed adjacent the second ends of the first, second and third waveguides configured to receive the light patterns from the first, second and third waveguides, and to project the same in front of the vehicle.

4. The vehicle lighting system of claim 3, wherein the third waveguide has a refracting surface array disposed within the body of the third waveguide between the first and second ends, the refracting surface array being configured to shape the light received from the LED light source to form the third light pattern at the second end of the third waveguide.

5. The vehicle lighting system of claim 3, wherein each of the first, second and third waveguides is secured to the common mounting member via an aperture and opening mounting arrangement interposed between the common mounting member and the respective waveguide.

6. The vehicle lighting system of claim 5, wherein the aperture and opening mounting arrangements of each of the first, second and third waveguides are differently configured relative to each other.

7. The vehicle lighting system of claim 3, wherein the first waveguide is oriented at a first angle relative to the common mounting member, the second waveguide is mounted to the common mounting member above the first waveguide at its first end and rests on the first waveguide at its second end, and the third waveguide is mounted to the common mounting member above the second waveguide at its first end and rests on the second waveguide at its second end.

8. The vehicle lighting system of claim 7, wherein the lighting system is adapted to be mounted to a vehicle at an elevated location above an implement associated with the vehicle so as to enable light patterns emitted by the first, second and third waveguides to illuminate areas in front of the implement.

9. A lighting system for a vehicle, comprising:

an LED light source adapted to be mounted to a vehicle, the LED light source configured to emit a light;

a first waveguide defining oppositely facing first and second ends and a body therebetween, wherein the first waveguide is configured to receive light emitted from the LED light source at the first end and output a first light pattern at the second end;

a second waveguide defining oppositely facing first and second ends and a body therebetween, wherein the second waveguide is configured to receive light emitted from the LED light source at the first end and output a second light pattern at the second end;

one or more of the first and second waveguides having a refracting surface array disposed within the body of the first and/or second waveguide between the first and second ends, the refracting surface array being configured to shape light received from the LED light source to form the light pattern at the second end of the first and/or second waveguide;

a third waveguide defining oppositely facing first and second ends and a body therebetween, wherein the third waveguide is configured to receive light emitted from the LED light source at the first end and output a third light pattern at the second end, wherein the third waveguide defines a solid body, devoid of any openings therein, between the first and second ends;

wherein the first end of each of the first, second and third waveguides is mounted to a common mounting member that includes the LED light source; and at least one projection lens disposed adjacent the second ends of the first, second and third waveguides configured to receive the light patterns from the first, second and third waveguides, and to project the same in front of the vehicle.

10. A lighting system mounted to a vehicle at an elevated location above an implement associated with the vehicle, comprising:

an LED light source adapted to be mounted to a vehicle, the LED light source configured to emit a light;

a first waveguide defining oppositely facing first and s if second ends and a body therebetween, wherein the first waveguide is configured to receive light emitted from the LED light source at the first end and output a first light pattern at the second end;

a second waveguide defining oppositely facing first and second ends and a body therebetween, wherein the second waveguide is configured to receive light emitted from the at least one LED light source at the first end and output a second light pattern at the second end, wherein the second light pattern that is emitted from the second end of the second waveguide is differently configured relative to the first light pattern that is emitted by the second end of the first waveguide;

wherein one or more of the first and second waveguides includes a refracting surface array disposed within the body of the first and/or second waveguide between the first and second ends, the refracting surface array being configured to shape light received from the LED light source to form the light pattern at the second end of the first and/or second waveguide;

a third waveguide defining oppositely facing first and second ends and a body therebetween, wherein the third waveguide is configured to receive light emitted from the LED light source at the first end and output a third light pattern at the second end, wherein the third light pattern that is emitted from the second end of the third waveguide is differently configured relative to both the first light pattern that is emitted by the second end of the first waveguide and the second light pattern that is emitted by the second end of the second waveguide;

wherein the first end of each of the first, second and third waveguides is mounted to a common mounting member that includes the LED light source; and at least one projection lens disposed adjacent the second ends of the first, second and third waveguides configured to receive the light pattern from the first, second and third waveguides, and to project the same in front of the vehicle;

wherein the elevated location of the lighting system enables light patterns emitted by the first, second and third waveguides to illuminate areas in front of the implement.

11. The vehicle lighting system of claim 10, wherein the third waveguide has a refracting surface array disposed within the body of the third waveguide between the first and second ends, the refracting surface array being configured to shape the light received from the LED light source to form the third light pattern at the second end of the third waveguide.

12. The vehicle lighting system of claim 10, wherein the third waveguide defines a solid body, devoid of any openings therein, between the first and second ends.

13. A lighting system adapted for mounting to a vehicle at an elevated location above an implement associated with the vehicle, comprising:

an LED light source adapted to be mounted to a vehicle, the LED light source configured to emit a light;

a low beam waveguide defining oppositely facing first and second ends and a body therebetween, wherein the low beam waveguide is configured to receive light emitted from the LED light source at the first end and output a low beam light pattern at the second end;

a high beam waveguide defining oppositely facing first and second ends and a body therebetween, wherein the high beam waveguide is configured to receive light emitted from the at least one LED light source at the first end and output a high beam light pattern at the second end, wherein the high beam light pattern that is emitted from the second end of the high beam waveguide is differently configured relative to the low beam light pattern that is emitted by the second end of the low beam waveguide;

an extended high beam waveguide defining oppositely facing first and second ends and a body therebetween, wherein the extended high beam waveguide is configured to receive light emitted from the LED light source at the first end and output an extended high beam light pattern at the second end, wherein the extended high beam light pattern that is emitted from the second end of the extended high beam waveguide is differently configured relative to both the low beam light pattern that is emitted by the second end of the low beam waveguide and the second light pattern that is emitted by the second end of the high beam waveguide, and wherein the extended high beam waveguide is configured such that the extended high beam has a narrower transverse dimension than that of the low beam and high beam light patterns;

wherein the first end of each of the low beam, high beam and extended high beam waveguides is mounted to a common mounting member that includes the LED light source; and at least one projection lens disposed adjacent the second ends of the low beam, high beam and extended high beam waveguides configured to receive the light pattern from the low beam, high beam and extended high beam waveguides, and to project the same in front of the vehicle;

wherein the elevated location of the lighting system enables the low beam and high beam light patterns to illuminate areas forwardly of the implement, and enables the extended high beam to illuminate areas forwardly of the areas illuminated by both the low beam and the high beam light patterns.

14. The vehicle lighting system of claim 13, wherein each of the first, second and third waveguides is secured to the common mounting member via an aperture and opening mounting arrangement interposed between the common mounting member and the respective waveguide.

15. The vehicle lighting system of claim 14, wherein the aperture and opening mounting arrangements of each of the first, second and third waveguides are differently configured relative to each other.

16. The vehicle lighting system of claim 13, wherein the first waveguide is oriented at a first angle relative to the common mounting member, the second waveguide is mounted to the common mounting member above the first waveguide at its first end and rests on the first waveguide at its second end, and the third waveguide is mounted to the common mounting member above the second waveguide at its first end and rests on the second waveguide at its second end.

17. A lighting system for a vehicle, comprising:

an LED light source adapted to be mounted to a vehicle, the LED light source configured to emit a light;

a first waveguide defining oppositely facing first and second ends and a body therebetween, wherein the first waveguide is configured to receive light emitted from the LED light source at the first end and output a first light pattern at the second end;

a second waveguide defining oppositely facing first and second ends and a body therebetween, wherein the second waveguide is configured to receive light emitted from the LED light source at the first end and output a second light pattern at the second end;

one or more of the first and second waveguides having a refracting surface array disposed within the body of the first and/or second waveguide between the first and second ends, the refracting surface array being configured to shape light received from the LED light source to form the light pattern at the second end of the first and/or second waveguide;

a third waveguide defining oppositely facing first and second ends and a body therebetween, wherein the third waveguide is configured to receive light emitted from the LED light source at the first end and output a third light pattern at the second end;

wherein the first end of each of the first, second and third waveguides is mounted to a common mounting member via an aperture and opening mounting arrangement interposed between the common mounting member and the respective waveguide, wherein the common mounting member includes the LED light source and at least one projection lens disposed adjacent the second ends of the first, second and third waveguides configured to receive the light patterns from the first, second and third waveguides, and to project the same in front of the vehicle.

18. The vehicle lighting system of claim 17, wherein the aperture and opening mounting arrangements of each of the first, second and third waveguides are differently configured relative to each other.

* * * * *